Patented Sept. 25, 1945

2,385,572

UNITED STATES PATENT OFFICE 2,385,572

PROCESS OF HYDRATING TURPENTINE AND LIKE MATTERS AND PRODUCTS THEREOF

Torsten Hasselstrom, Savannah, Ga., and Burt L. Hampton, Jacksonville, Fla.; said Hampton assignor to G & A Laboratories, Inc., Savannah, Ga.

No Drawing. Application March 14, 1941, Serial No. 383,448

12 Claims. (Cl. 260—631.5)

This invention relates to a process of refining and hydrating pinene-containing materials and/or mixtures thereof.

Many processes are known by which turpentine may be hydrated such as, for example, mixing turpentine with dilute mineral acids. These prior processes suffer from the disadvantages that the non-miscibility of the turpentine with the diluent water of the treating acid slows down the action and prevents obtaining a satisfactory yield directly. Hence, expensive special catalysts have been utilized to secure high yields of terpin hydrate and/or terpineol, which renders the hydration of turpentines or products thereof a matter accomplished at relatively high costs, as the effective catalysts usually could not be recovered directly or to an economic extent for continued cyclic operations.

It has been found that superior yields may be obtained, and a greater degree of refinement effected, by employing certain natural and/or artificial foots of turpentine substances as catalysts during the course of the reaction. Such substances appear to act both as emulsifiers and as hydrating catalysts in controlling the course and degree of the reaction occurring.

Broadly speaking, the invention comprises the hydration of pinene-containing material, by the action of dilute mineral acids, such as hydrochloric, phosphoric and, preferably, sulfuric acid, in the presence of such natural foots of turpentine, artificial foots of turpentine, rosin derivatives such as rosin oils, rosin residue, pine tar, and like products. The reaction progresses without external heating and substantially at room temperature, upon substantially continuous agitation. Terpin hydrate stratifies in an upper layer, having the consistency of a semi-solid mass which can be separated by decanting, filtering or like means. The liquid lower layer or filtrate of un-reacted turpentine and parts of the treating and catalyzing materials can then be agitated further for the formation of more terpin hydrate. The procedure is repeated until no more terpin hydrate is separated. The residual liquid comprises spent turpentine (consisting largely of dipentene) and parts of the treating and catalyzing materials and may be restored to strength and then employed as dilute mineral acid mixture for hydration of further pinene-containing material.

This semi-solid upper layer is preferably subjected to centrifugal filtration, and the solid component washed with water until it is practically free from mineral acids. It then comprises a crude terpin hydrate and consists mainly of terpin hydrate, bi-cyclic terpenes, mono-cyclic terpenes, and the hydrated terpenes commonly known to the art as pine oil. The washing operation normally results in a separation, from the mixture with the wash liquor, of a secondary semi-solid upper layer which can be filtered in an appropriate manner to yield a solid material consisting of terpin hydrate, which may be further purified by washing with dilute alkali solution and water, and then re-crystallizing from a suitable solvent such as water and/or ethanol to produce chemically pure terpin hydrate. Further, the crude terpin hydrate may directly be used as a raw material for the making of alpha-terpeneol by processes known to the art. The liquid terpenes, obtained after the separation of terpin hydrate from the original crude semi-solid upper layer, may be subjected to distillation in steam, super-heated steam or otherwise to a fractional distillation, preferably with the prior addition of an alkali such as an alkali metal hydroxide, an earth alkali oxide or hydroxide, or an alkali or alkaline-earth-carbonate for neutralizing any catalyst and/or mineral acid present. The distillation results in a separation of bi-cyclic terpenes, mono-cyclic terpenes, and pine oil. The fractional distillation may be carried out at ordinary pressure, but it is preferred to employ a reduced pressure to avoid any decomposition of the materials.

It is well known to the art that sulfate turpentine has the evil odor of mercaptans and/or other sulfur derivatives. These have been found to be volatile upon steam treatment of the hydrated product, and can be removed by steam distillation or steaming to produce a terpin hydrate free of these odors. Hence, a feature of the invention is the steaming of terpin hydrate made from crude sulfate turpentine to remove evil and bad odors from this substance.

The following examples will serve to illustrate the invention, but are not restrictive as to the details set out therein:

*Example I*

A mixture of 185 gallons of sulfuric acid solution (30 percent by weight), 824 pounds of gum turpentine and 39.2 pounds of pine oil foots was stirred at 28–31° for 23 hours. The stirring was stopped and the reaction mass was allowed to separate into two layers. The liquid acidic lower layer is separated, and the semi-solid upper layer is subjected to filtration in a centrifuge, so that the solid terpin hydrate is separated from the unreacted turpentine (noted as "spent" turpentine) and dissolved materials. The terpin hydrate was washed with water, with dilute sodium carbonate solution, and finally with water.

Yields:

| | Pounds |
|---|---|
| Liquid layer (original emulsifier, dipentene, unreacted pinene, and pine oil) | 470 |
| Terpine hydrate (or 55 percent) | 454 |
| Spent turpentine and dissolved materials | 430 |

The original gum turpentine had a boiling point of 156–168; a specific gravity (25 degrees C.) of 0.865 and a refractive index ($N_D$ 25 degrees) of 1.4722. The pine oil foots employed as an emulsifier-catalyst was the product commercially obtained by steam distillation of pine oil, and comprised those undetermined substances which are not volatile with steam under normal conditions of such distillation.

The liquid layer comprises original emulsifier, dipentene, unreacted pinene and pine oil. The relative percentages of these components varies largely, but may comprise from 30–80 percent of pinene, 30–80 percent of dipentene and 8–15 percent of pine oil. This liquid lower layer also usually contains some traces of turpentine in suspension. It can be recovered, made up in the relative original strength in sulfuric acid, and immediately re-used for a subsequent operation by introducing a further like quantity of gum turpentine.

*Example II*

310 gallons sulfuric acid solution (30 percent by weight), 1254 pounds gum turpentine, and 59.5 pounds pine oil foots were stirred for 22 hours at 27–31° and treated as in Example I.

Yields:

| | Pounds |
|---|---|
| Liquid layer | 659 |
| Terpine hydrate or 45.8 percent | 574 |
| Spent turpentine mixture of the same general composition as before | 600 |

*Example III*

The spent turpentine consists mainly of dipentene (a material not originally present in gum spirits of turpentine) and is subject to hydration with great difficulty under the aforesaid conditions. It is, however, possible to effect a further hydration of this component.

1120 pounds of the spent turpentine mixture accumulated from Examples I and II, were stirred for 68 hours at 27–31° C. with 264 gallons of sulfuric acid solution (30 percent by weight) and treated as in Example I.

Yields:
  Spent turpentine 605 pounds;
  Terpin hydrate 360 pounds or 31.8 percent.

This latter spent turpentine fraction was steam-distilled and then fractionated in vacuum at 2–20 mm. pressure.

| | °C. |
|---|---|
| I. 4 percent (pinene) | 56–67 |
| II. 62.1 percent (dipentene) | 67–82 |
| III. 4 percent (mixture of dipentene and pine oil) | 50–63 |
| IV. 24.3 percent (pine oil equivalent to terpineol) | 63–67 |

*Example IV*

A mixture of 200 gallons of sulfuric acid solution, 783 pounds of crude sulfate turpentine and 68 pounds of pine oil foots was stirred at 23–24° for 51 hours. The crude sulfate turpentine had a boiling point of 153–170 degrees C.; a specific gravity (25 degrees C.) of 0.860–0.870; and a refractive index ($N_D$ 25 degrees) of 1.463–1.479. The product was allowed to settle, and the liquid drained off. The semi-solid upper layer was washed with water, and centrifugally filtered. The solid residue comprises 347 pounds of terpin hydrate mixed with mercaptans (44.3 percent). 540 pounds of liquid was recovered in the centrifugal filtration.

The terpin hydrate, smelling of mercaptans and other sulfur compounds, was covered with about an equal amount of water and subjected to steaming at a temperature of 100–110 degrees C. for about two hours; after cooling, the terpin hydrate was removed by filtration in a centrifuge whereby this product was obtained odorless.

*Example V*

300 parts of fresh gum turpentines to which rosin oil has been added to the extent of 10 percent thereof, was mixed with 600 pounds of dilute (30 percent by weight) sulfuric acid and stirred for 18 hours at 20–25 degrees C. The liquid layer was permitted to settle; the upper semi-solid layer was filtered and treated as in the above examples. 19 percent yield of terpin hydrate was obtained, along with 225 parts of liquid containing about 45 percent of pinene, 30 percent of dipentene and 6 percent of pine oil.

In Example I above, the mineral acid was stated to be of 30 percent concentration (3.05 lbs. $H_2SO_4$ per gallon) and in Example IV of 35 percent concentration (3.68 lbs. $H_2SO_4$ per gallon). Similar results can be obtained at concentrations between 5 and 50 percent, but it is preferred to employ a concentration between 15 and 30 percent. The quantity of acid solution utilized will vary according to the concentration of the acid and the particular acid selected, in a manner understood in the art.

As set out above, the procedures can be practiced cyclically by utilizing the recovered lower liquid layer which contains substantially all of the sulfuric acid and likewise contains a sufficient quantity of original emulsifier-catalyst and of emulsifier-catalyst materials derived from the turpentine, so that this layer may be immediately re-used upon bringing it to the original strength. The quantity of sulfuric acid in the water phase gradually becomes greater during the reaction as the water is removed by the hydration action. Water may be added during the course of the reaction itself, to maintain the desired concentration, or the water may be added to the separated liquid layer prior to the introduction of a further quantity of fresh turpentine for a further reaction; and it is feasible, using appropriate acidity control methods, to conduct a substantially continuous operation by introducing water and turpentine from time to time, while permitting the formed terpin hydrate to come to the top of the reaction liquor and separating it therefrom, for an initial centrifugal separation from reagents which are then returned to the treating chamber. Similarly, it is possible to interrupt a separation at the end of a period of time, permit separation of the impure terpin hydrate, and then continue the operation for a further period, either with or without an introduction of further turpentine and water.

The bi-cyclic terpene fractions obtained may be usefully employed as a superior gum spirits of turpentine in paints as solvents.

Among the products obtainable, according to the aforesaid example, is a composition of matter comprising pinene, dipentene, terpineol and from 1 to 35 percent of material utilizable as catalysts for the reaction, some of the latter having been hydrated and/or sulfonated during the reaction. This material is adaptable for employment as a rubber softener in the rubber industry.

The temperature of the liquor tends to rise during the reaction, but with the specified proportions of materials, this temperature rise is in no wise deleterious, and usually tends to facilitate the reaction itself.

The proportion of emulsifier-catalyst to be employed varies with the particular materials used. It has been found that with the employment of pine oil foots, from 4 to 20 percent is effective: while from 5 to 10 percent is presently preferred as providing a reaction at an economical velocity to a satisfactory end point and without the production of undesirably large quantities of by-products.

When "old" turpentine is employed, as an emulsifier-catalyst for dehydration of fresh turpentine, the initial stage of reaction should comprise the mixing of the two turpentines in proportion dependent upon the quantity of foots in the old turpentine, which usually contains in excess of 6 or 7 percent of such foots. The quantity of such foots in the old turpentine can be ascertained by steam distillation to determine the residue. In many cases, one part of old turpentine will provide a sufficiency of emulsifier-catalyst for the hydration of the turpentine therein and also of the turpentine in one or two further parts of new turpentine. It may be pointed out that ordinarily fresh turpentine itself only contains about 0.7 to 2 percent of foots, a quantity insufficient for its economical direct hydration.

By "natural foots" we refer to oxygen-containing compounds which are present in gum spirits of turpentine and boiling above pinene. These non-defined compounds are apparently produced in turpentine on deterioration of the same when exposed to air and moisture, and may be produced in turpentine by mild oxidation, such as by passing air or oxygen through the same in the presence or absence of a catalyst for effecting entry of oxygen into the molecule. Thus, ordinary fresh turpentine may be blown with oxygen at ordinary temperature for 4 to 8 hours. The product can then be mixed with one or more parts of fresh turpentine, and subjected to hydration in the presence of mineral acid solution; or it may be subjected to a steam-distillation and the foots used as an emulsifier-catalyst for further fresh turpentine.

Generally, the foots from distillation of naval stores may be employed for effecting the action. Thus, rosin residues, pine oil foots; the residues from the manufacture of pine oil, dipentene, and like products; the residues from refining rosin, turpentine and pine oil by the steam solvent process ordinarily used in extracting naval stores from stump wood; and mixtures thereof are effective. In general, the products which may be regarded as still-bottom wastes from the distillation of naval stores may be utilized in proportion dependent upon the history and concentration of the individual components. Such materials may be grouped under the name "naval stores foots".

In some instances, the emulsifier-catalyst can advantageously be mixed with sulfuric acid solution and permitted to react prior to the introduction of the turpentine. The reaction produces a sulfonation of portions of the emulsifier-catalyst, and the product has the capability of so controlling the interfacial conditions of a turpentine-water emulsion, in the presence of sulfuric acid that the reaction proceeds smoothly to a satisfactory end point.

It is obvious that the invention is not limited to the specific examples given, but may be modified in many ways within the scope of the appended claims.

We claim:

1. The process of hydrating turpentine, which comprises subjecting turpentine containing not less than 4 percent of turpentine foots to reaction at substantially room temperature with a dilute mineral acid solution.

2. The process of hydrating turpentine, which comprises adding turpentine foots thereto until the total content of foots is between 4 and 20 percent, adding a mineral acid solution having a concentration of 5 to 50 percent, and agitating at room temperature.

3. The process of hydrating turpentine, which comprises adding turpentine foots thereto until the total content of foots is substantially 4 to 10 percent, adding a sulfuric acid solution having a concentration of substantially 30 to 35 percent, agitating at room temperature, permitting settling and separating a semi-solid upper layer containing hydrated products, restoring the lower liquid layer to substantially the original acid concentration, introducing to said restored liquor a further quantity of turpentine, and continuing the agitation.

4. The process of hydrating a turpentine low in foots, which comprises mildly oxidizing the same to increase the proportion of foots to a content of 5 to 10 percent, and then agitating in admixture with a dilute hydrating acid solution at substantially room temperature.

5. The process of hydrating a turpentine low in foots, which comprises blowing with an oxygen gas to increase the proportion of foots to a content of 5 to 10 percent, and then agitating in admixture with a dilute hydrating acid solution at substantially room temperature.

6. The process of hydrating a turpentine low in foots, which comprises mixing therewith a turpentine containing a high proportion of foots so that the mixture has more than 4 percent of foots, then agitating in admixture with a dilute hydrating acid solution at substantially room temperature, separating a light hydrated product from a heavy acid solution, introducing water and turpentine to said separated acid solution, and continuing the agitation.

7. The process of hydrating a turpentine low in foots, which comprises augmenting the foots therein to at least 4 percent, then agitating in admixture with a dilute hydrating acid solution at substantially room temperature, separating a light hydrated product from a heavy acid solution, introducing water and turpentine to said separated acid solution, and continuing the agitation.

8. The method of obtaining terpin hydrate from sulfate turpentine, which comprises the step of hydrating the turpentine in the presence of not less than 4 percent of foots and of a dilute mineral acid solution, permitting settling and separating a supernatant layer from the reaction material, and subjecting the material of said layer to the action of steam for effecting volatilization of sulfur compounds therefrom.

9. The process of hydrating a turpentine low in foots, which comprises mixing therewith the foots from distillation of naval stores to produce a blend having substantially 5 to 10 percent of foots, and then agitating in admixture with a dilute hydrating acid solution at substantially room temperature.

10. The process of hydrating turpentine, which comprises adding naval stores foots to turpentine in a proportion to give the mixture a total foots concentration in excess of 4 percent, adding a mineral acid solution having a concentration of substantially 30 percent of acid, agitating at room temperature, separating a light hydrated product from a heavy acid solution, and introducing water and turpentine to said recovered acid solution, and continuing the agitation.

11. The process of hydrating turpentine, which comprises mildly oxidizing a portion of turpentine to increase the proportion of foots, mixing the oxidized material with another portion of turpentine having a lesser proportion of foots and thereby producing a blend containing at least 4 percent of foots, and then agitating the blend in admixture with a dilute hydrating acid solution at substantially room temperature.

12. The process of hydrating turpentine, which comprises mildly oxidizing a portion of turpentine to increase the proportion of foots, mixing the oxidized material with another portion of turpentine having a lesser proportion of foots and thereby producing a blend containing at least 4 percent of foots, then agitating the blend in admixture with a dilute hydrating acid solution at substantially room temperature, permitting settling and separating a semi-solid upper layer containing hydrated products, restoring the lower liquid layer to substantially the original acid concentration, introducing to the restored liquor a further quantity of turpentine low in foots, and continuing the agitation.

TORSTEN HASSELSTROM.
BURT L. HAMPTON.